(12) United States Patent
Yueh

(10) Patent No.: US 6,966,220 B2
(45) Date of Patent: Nov. 22, 2005

(54) DEVICE FOR AUTOMATIC TIRE INFLATION AND TIRE PRESSURE DISPLAY

(75) Inventor: Wen Hsiang Yueh, Hsinchuang (TW)

(73) Assignee: Partner Tech Corp., Taipei (TW)

( * ) Notice: Subject to any disclaimer, the term of this patent is extended or adjusted under 35 U.S.C. 154(b) by 44 days.

(21) Appl. No.: 10/813,048

(22) Filed: Mar. 31, 2004

(65) Prior Publication Data

US 2005/0217360 A1    Oct. 6, 2005

(51) Int. Cl.[7] ............................................. B60C 23/10
(52) U.S. Cl. ..................... 73/146; 152/415; 137/224
(58) Field of Search ................ 73/146, 146.2, 73/146.5; 152/415; 137/224; 340/442

(56) References Cited

U.S. PATENT DOCUMENTS

| | | | | |
|---|---|---|---|---|
| 4,578,669 A | * | 3/1986 | Woods ........................ | 340/518 |
| 5,253,687 A | * | 10/1993 | Beverly et al. ............. | 152/416 |
| 5,629,873 A | * | 5/1997 | Mittal et al. ................ | 702/140 |
| 6,098,682 A | * | 8/2000 | Kis .............................. | 152/415 |
| 6,144,295 A | * | 11/2000 | Adams et al. ............... | 340/442 |
| 6,293,147 B1 | * | 9/2001 | Parker et al. ................. | 73/462 |
| 6,401,743 B1 | * | 6/2002 | Naedler ....................... | 137/224 |

* cited by examiner

*Primary Examiner*—Edward Lefkowitz
*Assistant Examiner*—Andre Allen
(74) *Attorney, Agent, or Firm*—Rosenberg, Klein & Lee

(57) ABSTRACT

A device for automatic tire inflation and tire pressure display has a tire pressure measurement unit, a tire temperature sensor (a thermometer) and a gradienter for measuring the tire balance. The tire pressure measurement unit has a tire pressure measurement unit, a voltage regulating circuit of power source, a microprocessor control unit, a wireless transceiving module and an inflation/deflation control component. The tire pressure measurement unit measures the tire pressure value of a tested tire. The tire pressure value is then wirelessly displayed on a display unit in a vehicle so that the user can know the present status of a tire. The user can also maneuver a function key to select an operation according to the displayed data and send this message to the tire room to execute inflation or deflation of the tire.

2 Claims, 2 Drawing Sheets

DEVICE FOR AUTOMATIC TIRE INFLATION AND TIRE PRESSURE DISPLAY

FIELD OF THE INVENTION

The present invention relates to a device for automatic tire inflation and tire pressure display and, more particularly, to a tire pressure measurement device capable of wirelessly detecting tire temperature and tire balance.

BACKGROUND OF THE INVENTION

Tire load has a direct relation with pneumatic pressure. Most of the tire load is born by compressed air. If the pneumatic level is insufficient, the load of the tire will be too large, the tire body has to bear the load, causing deformation of the tire body and increased contact area with the ground. This results in increased abrasion and promotes flat tires. If the pneumatic level is too high, the tire will lose its resiliency and absorb shock poorly. The internal structure of the tire will bear a too large tension and be easily damaged. The tire will be too circular and only the center of the tire face can touch the ground to speed up abrasion of the tire.

Additionally, whether the rotation of a steering tire is balanced has a large influence on driving safety. If the steering tire is imbalanced, the vibration will be violent and cause damage to the steering mechanism or even result in a serious accident when driving at a high speed. If the weight of the tire is nonuniform, the centrifugal force due to rotation will be nonuniform, hence causing vibration. If the rotation speed is high, this vibration will be large enough to damage each component of the tire and the suspension system. Therefore, each part of a tire should be balanced when the tire rotates.

Moreover, if the tire temperature is too high, the load of the tire will be too large, to cause hazards like a flat tire.

Accordingly, the present invention aims to propose a tire pressure measurement device capable of detecting the tire temperature and tire balance.

SUMMARY OF THE INVENTION

One object of the present invention is to provide a tire pressure measurement device capable of wirelessly detecting the tire temperature and tire balance.

To achieve the above object, the present invention proposes a device for automatic tire inflation and tire pressure display. The device comprises a tire pressure measurement unit, a tire temperature sensor and a gradienter. The tire pressure measurement unit detects the tire pressure value of a tested tire and wirelessly displays it on a display unit in a vehicle. A user can then maneuver a function key to select an operation according to data displayed on the display unit and send this message to a tire room for carrying out inflation/deflation of the tire. The tire temperature sensor is disposed in the tire room and used to measure the temperature of the tire for wireless display on the display unit in the vehicle via the tire pressure measurement unit so that the user can know the present status. The gradienter is disposed in the tire room. The gradienter is used to measure the balance of the tire for wireless display on the display unit in the vehicle via the tire pressure measurement unit so that the user can know the present status.

The above tire pressure measurement unit further comprises a voltage regulating circuit of power source, a wireless transceiving module, an inflation/deflation control component and a first microprocessor control unit. The voltage regulating circuit of power source provides working voltages for subassemblies. The first microprocessor control unit is connected with the voltage regulating circuit of power source, the wireless transceiving module and the inflation/deflation control component. The first microprocessor control unit is used to process measured signal data and send them out wirelessly via the wireless transceiving module or receive signals from the wireless transceiving module for operation of the inflation/deflation control component.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1:
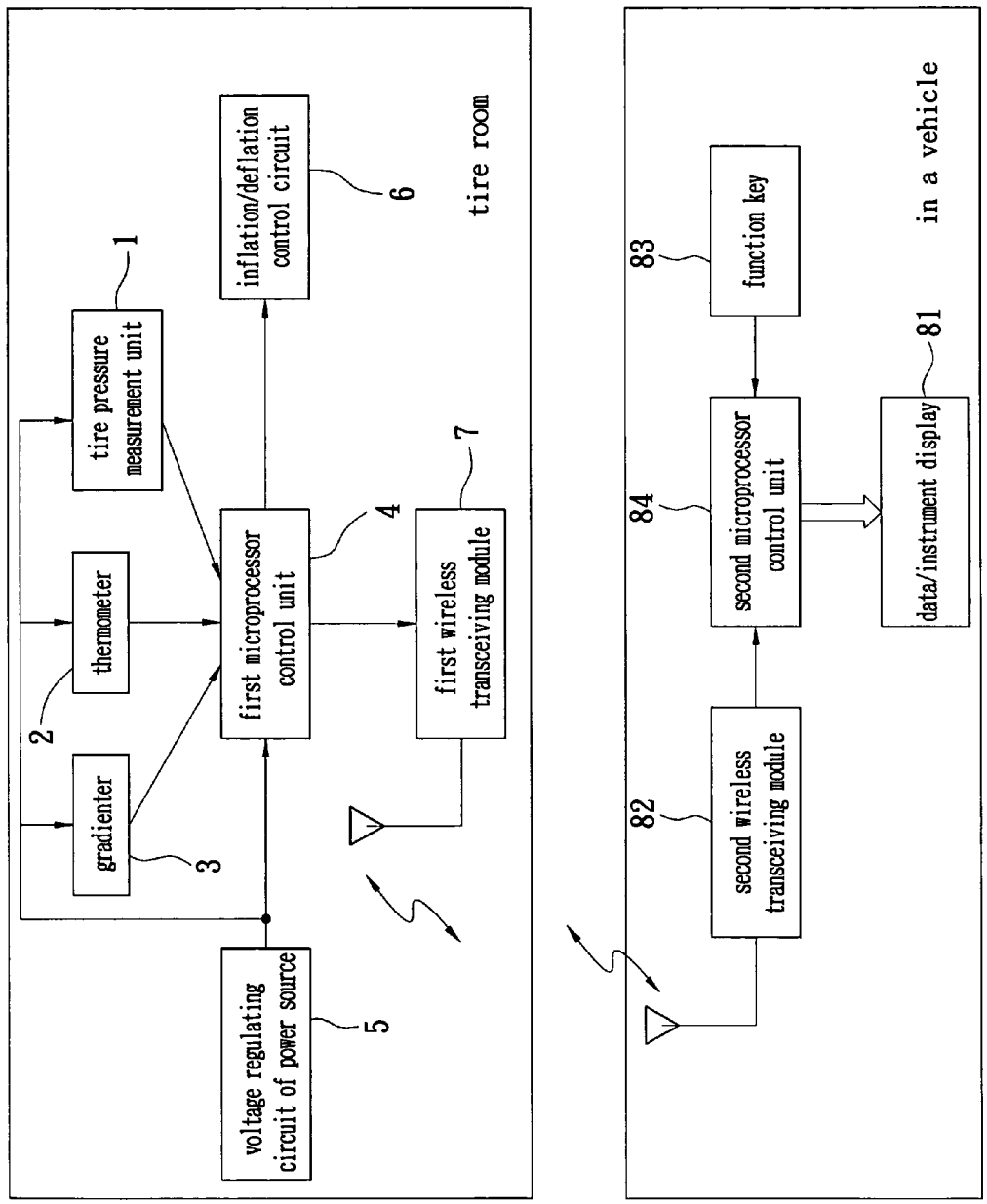
FIG. 1 is an architecture diagram of the present invention.

As shown in FIG. 1, a device for automatic tire inflation and tire pressure display of the present invention comprises a tire pressure measurement unit 1, a thermometer 2, a gradienter 3, a first microprocessor control unit 4, a voltage regulating circuit of power source 5, an inflation/deflation control component 6 and a first wireless transceiving module 7.

Figure 2:
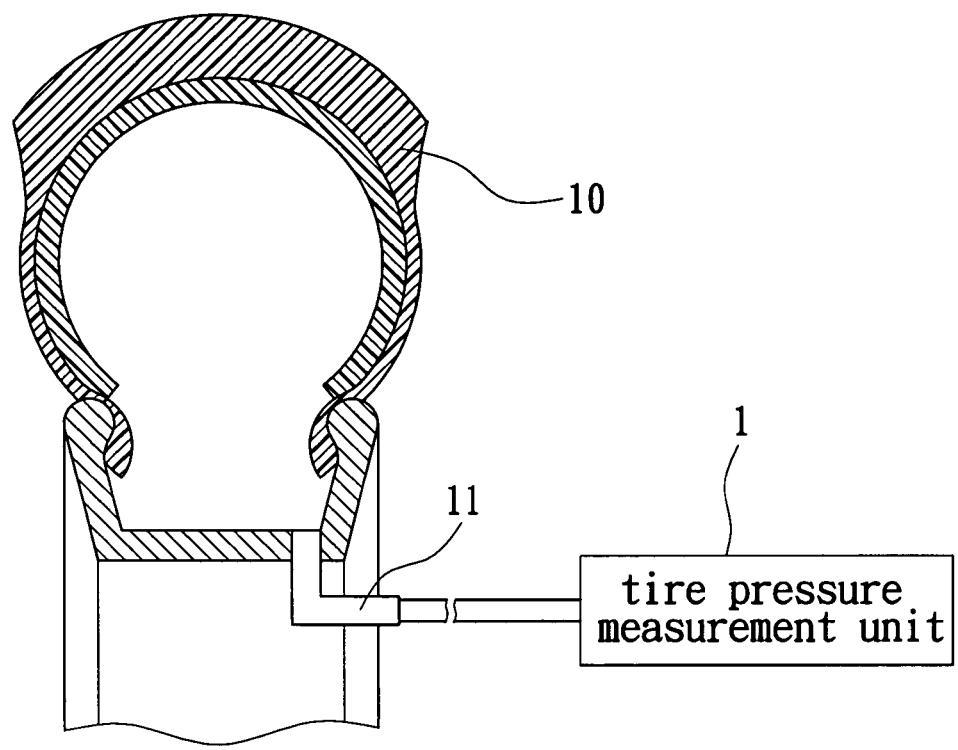
FIG. 2 is a cross-sectional view showing a tire pressure measurement unit of the present invention fixedly disposed with an air cock of a tire.

As shown in FIG. 2, the tire pressure measurement unit 1 is fixedly arranged on an air cock 11 of a tire 10, and is used to detect the tire pressure value of a tested tire to measure abnormal signals such as high tire pressure, low tire pressure or an insufficient electric power.

The thermometer 2 is disposed in a tire room for measuring the temperature of the tire.

The gradienter 3 is disposed in the tire room for measuring the balance state of the tire.

The voltage regulating circuit of power source 5 is used to provide working voltages for subassemblies.

The first microprocessor control unit 4 is connected with the output terminals of the voltage regulating circuit of power source 5 and the first wireless transceiving module 7. The first microprocessor control unit 4 processes the above measured signal data and sends them out wirelessly via the first wireless transceiving module 7 or receives signals from the first wireless transceiving module 7 to carry out inflation/deflation of the tire 10.

A data/instrument display 81 is disposed in a vehicle for displaying relevant messages like the above measured data.

A second microprocessor control unit 84 is connected with the data/instrument display 81, a second wireless transceiving module 82 and a function key 83. The second microprocessor control unit 84 sends messages received by the second wireless transceiving module 82 to the data/instrument display 81 for display. Alternatively, a user can maneuver the function key 83 according to the message displayed on the data/instrument display 81 to send this message to the second microprocessor control unit 84 manually or automatically. Through the internal operations of the second microprocessor control unit 84, the command is sent out via the second wireless transceiving module 82.

When the first microprocessor control unit 4 detects an abnormal signal of the tire pressure measurement unit 1, it will send this message to the second wireless transceiving module 82 in the vehicle via the first wireless transceiving module 7. The second microprocessor control unit 84 will then send this message to the data/instrument display 81 for display.

At this time, the user can maneuver the function key 83 according to the data displayed on the data/instrument display 81 to send this message to the second microprocessor control unit 84 manually or automatically. The second microprocessor control unit 84 will send out a signal to the first wireless transceiving module 7 of the tire so that the first microprocessor control unit 4 can drive the inflation/deflation control component 6 to function (e.g., carrying out an inflation action or a deflation action through a gas trap).

Similarly, when the first microprocessor control unit 4 detects data of the thermometer 3 or the gradienter 4, it will send this data to the second wireless transceiving module 82 in the vehicle via the first wireless transceiving module 7. The second microprocessor control unit 84 will send this data to the data/instrument display 81 for display so that the user can know the present status.

To sum up, through the design of the present invention, the user can know exactly the tire pressure, the tire temperature and whether the tire is balanced or not.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A device for automatic tire inflation and tire pressure display, comprising:

a tire pressure measurement unit for detecting a tire pressure value of a tested tire and wirelessly displaying said tire pressure value on a display unit in a vehicle, allowing a user to maneuver a function key and select an operation according to data displayed on said display unit and send a selected operation message to a tire room to execute tire inflation or deflation;

a tire temperature sensor disposed in said tire room and used to measure a temperature of said tire for wirelessly displaying on said display unit in the vehicle via said tire pressure measurement unit, allowing the user to know a present temperature status thereof; and a gradienter disposed in said tire room and used to measure a balance of said tire for wirelessly displaying on said display unit in the vehicle via said tire pressure measurement unit, allowing the user to know a present balance status thereof.

2. The device for automatic tire inflation and tire pressure display as claimed in claim 1, wherein said tire pressure measurement unit comprises:

a voltage regulating circuit of a power source for providing working voltages for subassemblies;

a wireless transceiving module;

an inflation/deflation control component; and a first microprocessor control unit connected to said voltage regulating circuit of power source, said wireless transceiving module and said inflation/deflation control component, said first microprocessor control unit being used to process measured signal data and send out said measured signal data wirelessly via said wireless transceiving module or receive signals from said wireless transceiving module for operation of said inflation/deflation control component.

* * * * *